United States Patent [19]

Amin et al.

[11] Patent Number: 5,137,750
[45] Date of Patent: * Aug. 11, 1992

[54] METHOD OF MAKING A THIN FILM HEAD WITH CONTOURED POLE FACE EDGES FOR UNDERSHOOT REDUCTION

[75] Inventors: Nurul Amin, Burnsville; John Bortins, Bloomington; Ying D. Yan, Burnsville; Beat G. Keel, Prior Lake; Nathan Curland, St. Louis Park; Tim Madsen, Bloomington, all of Minn.

[73] Assignee: Seagate Technology, Inc., Scotts Valley, Calif.

[*] Notice: The portion of the term of this patent subsequent to Feb. 4, 2009 has been disclaimed.

[21] Appl. No.: 702,956

[22] Filed: May 20, 1991

Related U.S. Application Data

[63] Continuation-in-part of Ser. No. 609,921, Nov. 6, 1990, Pat. No. 5,084,957.

[51] Int. Cl.$^5$ .............. G11B 5/42; B05D 5/12
[52] U.S. Cl. .................. 427/116; 29/603; 360/119; 360/125; 427/131
[58] Field of Search .......... 29/603; 360/119-121, 360/125, 127; 427/130-132, 128, 116

[56] References Cited

U.S. PATENT DOCUMENTS

| | | | |
|---|---|---|---|
| 4,839,197 | 6/1989 | Henderson | 427/116 |
| 4,947,541 | 8/1990 | Toyoda et al. | 29/603 |
| 4,949,207 | 8/1990 | Lazzari | 360/119 |
| 4,970,615 | 11/1990 | Gau | 360/122 |
| 4,970,616 | 11/1990 | Ramaswamy | 360/122 |
| 4,992,901 | 2/1991 | Keel et al. | 360/110 |

OTHER PUBLICATIONS

Yamaha Corporation, Japan, *Yamaha Thin Film Head*, Sep. 1989.

*Primary Examiner*—Carl E. Hall
*Attorney, Agent, or Firm*—Kinney & Lange

[57] ABSTRACT

A thin film magnetic read/write head is manufactured using $Al_2O_3$ dams. The $Al_2O_3$ dams are formed using a sacrificial layer which is deposited upon a bottom pole layer. An $Al_2O_3$ layer is deposited over the sacrificial layer. When the sacrificial layer is removed, the $Al_2O_3$ layer forms dams between which a top pole piece is deposited. The sacrificial layer is removed using lapping and a selected chemical etch; partial lapping or chemical etch followed by chemical etch of the sacrificial layer which lifts-off overlying $Al_2O_3$; depositing photoresist dams and chemically etching the encapsulation layer and the sacrificial layer; or removal through physical or thermal shock of the $Al_2O_3$ layer sputtered at zero bias followed by a selective chemical etch of the sacrificial layer. The thin film magnetic head of the present invention has pole tips which provide an outside pole face contour that is significantly different from a pole tip contour along a gap region. This reduces an undershoot effect in readback pulses in a readback signal. The altered contour can be used on both top and bottom pole tips to eliminate both leading and trailing undershoots. Additionally, in shielded probe heads for vertical recording a gap region contour can be altered to achieve a similar reduction in leading undershoot.

14 Claims, 9 Drawing Sheets

METHOD OF MAKING A THIN FILM HEAD WITH CONTOURED POLE FACE EDGES FOR UNDERSHOOT REDUCTION

This is a continuation in part of patent application Ser. No. 07/609,921, filed Nov. 6, 1990, now U.S. Pat. No. 5,084,957 issued Feb. 4, 1992.

BACKGROUND OF THE INVENTION

The present invention relates to production of thin film magnetic heads. In particular, the invention relates to aligning the upper and lower pole tips in a thin film magnetic head using a sacrificial layer yielding a contoured pole face which provides reduced undershoot in a readback signal.

Thin film magnetic read/write heads are used for magnetically reading and writing information upon a magnetic storage medium such as a magnetic disc or a magnetic tape. It is highly desirable to provide a high density of information storage on the magnetic storage medium.

Recording systems typically become more cost effective by providing areal densities which are as high as possible for a given recording surface. In the case of rotating disc drives (both floppy and hard disc), the areal density is found by multiplying the number of bits per unit length along the track (linear density in units of bits per inch) by the number of tracks available per unit length in the radial direction (track density in units of tracks per inch).

The demand for increased storage density in magnetic storage media has led to reduced magnetic head dimensions. Magnetic heads are now fabricated in a manner similar to that used for semiconductor integrated circuits in the electronic industry.

During fabrication, many thin film magnetic heads are deposited across the surface of a wafer (or substrate). After the layers are deposited, the wafer is "diced" or sliced into many individual thin film heads, each carried by a portion of the wafer so that an upper pole tip, a lower pole tip, and a gap are exposed. The pole tips and the gap (and the portion of the substrate which underlies them) are then lapped in a direction generally inward, toward the center of thin film head, to achieve the desired dimensions. This lapping process is a grinding process in which the exposed portion of the top and bottom pole tips and the gap are applied to an abrasive, such as a diamond slurry. Electrical contacts are connected to conductive coils. The completed head is attached to a carrying fixture for use in reading and writing data on a magnetic storage medium such as a computer disc.

In operation, the exposed upper and lower pole tips are positioned near a moving magnetic storage medium. During the read operation, the changing magnetic flux of the moving storage medium impresses a changing magnetic flux upon upper and lower pole tips. The magnetic flux is carried through the pole tips and yoke core around the conductor coil. The changing magnetic flux induces an electrical voltage across the conductor coil which may be detected with electrical detection circuitry. The electrical voltage is representative of the changing magnetic flux produced by the moving magnetic storage medium.

During a write operation, an electrical current is caused to flow in the conductor coil. This electric current induces a magnetic field in top and bottom magnetic poles and causes a magnetic field across the gap between the upper and lower pole tips. A fringe field extends in the vicinity beyond the boundary of the pole tips and into the nearby magnetic storage medium. This fringe field may be used to impress magnetic fields upon the storage medium and magnetically write information.

The highest track density achievable is strongly influenced by the accuracy and precision of alignment of upper and lower pole tips and their width. Magnetic pole tips typically have a pole thickness in the range of about one micrometer to about five micrometers depending upon design criteria, i.e. a thicker pole for better overwriting efficiency and a thinner pole for increased resolution capability during the readback operation.

As track density increases, currently approaching and exceeding 2400 tracks per inch, the alignment between the upper and lower pole tips in thin film magnetic read/write heads has become critical. At such a high storage density, design criteria require magnetic transducers in which the bottom pole tip width is very nearly the same as the top pole tip width. Top and bottom pole tips should also be in close alignment. At these small dimensions, alignment between the pole tips of a head becomes critical, particularly as dimensions of the pole tips approach the tolerance and definition limits of the deposition techniques. A technique which provides better pole alignment begins with a top pole, bottom pole and a gap area separating the top and bottom poles, all fabricated substantially wider than desired. A narrower mask layer is then deposited upon the upper pole. The structure is then aligned using a material removal process ("milling") such as ion milling or reactive ion milling in which high energy ions bombard the pole tip region to remove the excess material (top pole, bottom pole and gap material) that extends beyond the edges of the mask layer. The mask layer protects only a portion of the top pole, bottom pole and gap so that the width of the completed pole tips is approximately the same as the width of the mask layer.

The noted alignment technique suffers from a number of drawbacks. The mask layer is difficult to remove from the pole tip structure after the milling process. To ensure adequate protection of the pole tips during milling, the mask must be very thick to withstand the milling process. A thick mask, however, decreases the ability to control the shape of the pole tips. Furthermore, if the remaining mask material is stripped away following milling, the delicate structure of the thin film head may be damaged. If, on the other hand, the mask layer is made thinner to improve process control and facilitate removal of the mask following ion milling, the risk of damaging the pole tip structure during milling is increased.

During readback of magnetically stored information, the thin film head provides an electrical output signal which is representative of both the relative strength of the magnetization in the media, and the magnetic field pattern of the read head. It is highly desirable to provide the highest level of information storage density possible for a given magnetic storage system. Unfortunately, increased storage density leads to a lower signal-to-noise ratio for the sensed signal from a given disk. The readback signal comprises a series of superimposed symbols whose existence and location are used to represent digital information.

Signal recovery errors will result if the detection circuitry is confused in one of the following ways:

1. Detecting a symbol that was not written;
2. Rejecting a symbol that was written;
3. Placing a written symbol in a wrong clock cell.

Cost effective detectors presently in use are confused by leading and trailing undershoots in the isolated readback pulses just as easily as they are confused by noise. This is because for an arbitrary recorded pattern, the undershoot readback waveform from one recorded transition can interfere with the main pulse of another transition and result in one of the above signal recovery errors.

Therefore, the undershoots reduce the maximum recording density which may be achieved in a magnetic storage system. Undershoot occurs due to discontinuities in the magnetic readback flux path characteristic of the finite pole lengths of the thin film recording head. Rather than trying to compensate for the undershoots in the data signal using sophisticated electronic decoding methods, it would be highly desirable and a significant contribution to the art to provide a thin film magnetic head which minimizes the leading and trailing undershoots in the isolated readback pulse.

An accurate and precise method of aligning pole tips and reducing undershoot in the readback signal would be an important contribution to the art.

SUMMARY OF THE INVENTION

The present invention provides closely aligned pole tips which yield reduced undershoots in isolated readback pulses in a thin film magnetic transducer. This may be used to yield increased data storage densities. In the present invention, the top pole is aligned with the bottom pole using dams made with the aid of a sacrificial layer. The dams are formed by depositing an encapsulation layer over a sacrificial layer. The sacrificial layer is deposited in substantial self alignment with the bottom pole. When the sacrificial layer is removed, the encapsulation layer which overlies the sacrificial layer "lifts off" from the surface. Following the removal of the sacrificial layer, the resultant empty cavity in the encapsulation layer forms edges of the dams. The sacrificial layer is removed through any suitable alternative. These alternatives include lapping, milling, selective chemical etching, lift-off, and removing through thermal or physical shock. The cavity is filled with magnetic material to form the top pole. During this process, a nonmagnetic gap is formed between the top pole and the bottom pole.

In the present invention, photoresist dams are deposited upon a substrate which carries the thin film magnetic head. A bottom pole is deposited between the photoresist dams. A sacrificial layer is deposited between the same photoresist dams upon the bottom pole. Typically, the sacrificial layer is a layer of copper. Next, the photoresist dams are removed and the pole tip region is coated with an encapsulation layer, typically of $Al_2O_3$. In accordance with the present invention, the encapsulation layer which covers the sacrificial layer is removed along with the sacrificial layer. Following this removal, the encapsulation layer forms dams on either side of the bottom pole. The dams extend above the sides of the bottom pole. Next, a gap layer is deposited over the bottom pole layer. Typically the gap layer comprises $Al_2O_3$. Additional photoresist dams are deposited upon the gap $Al_2O_3$ layer and are generally in alignment with the bottom pole. A top pole layer is deposited upon the gap $Al_2O_3$ layer. The top pole is aligned with the bottom pole by the dams formed by the encapsulation layer.

In accordance with the present invention, the encapsulation layer which overlies the bottom pole and covers the sacrificial layer may be removed using a number of techniques. The encapsulation layer can be removed using a lapping process. In the lapping process, the pole tip region is lapped so that the encapsulation layer is removed and the sacrificial layer is exposed. The sacrificial layer is selectively etched which leaves dams extended above either side of the bottom pole.

The overlying encapsulation layer can also be removed using a lift-off process. The encapsulation layer is deposited by a sputtering technique in which a sufficiently negative electrical bias potential and sufficiently high gas pressure are used to reduce deposition of the encapsulation layer at the corners of sacrificial layer. Following deposition of the encapsulation layer, a small amount of ion milling or chemical etching will expose the edges of sacrificial layer under the encapsulation layer. The overlying encapsulation layer is removed through lift-off using a selective chemical etch for the sacrificial layer. Again, dams are formed from the encapsulation layer which are aligned with the lower pole. The top pole may be deposited as described above.

The encapsulation layer can be removed by depositing photoresist dams on the encapsulation layer which leave a portion of the encapsulation layer exposed. A selective chemical etch is applied which etches the exposed portion of the encapsulation layer. The sacrificial layer and the photoresist dams are removed. Again, dams are formed from the encapsulation layer which are aligned with the lower pole. The top pole may be deposited as described above.

The encapsulation layer can also be removed by physical or thermal shock. If the encapsulation layer is sputtered upon the surface with a zero electrical bias potential, it will adhere poorly to the sacrificial layer. The structure can then be subjected to physical or thermal shocks which cause the overlying encapsulation layer to break free of the sacrificial layer. The sacrificial layer is selectively chemically etched and the top pole is deposited between the dams formed by the encapsulation layer and in alignment with the lower pole.

The present invention provides dams which are aligned with the bottom pole which can be used to deposit the top pole. The dams are formed in an encapsulation layer with a sacrificial layer. The encapsulation layer which overlies the sacrificial layer is removed using three alternative processes. $Al_2O_3$ provides an excellent encapsulation layer material because $Al_2O_3$ is nonmagnetic and residual $Al_2O_3$ will not degrade thin film head operation.

The present invention provides reduced undershoot in an isolated readback pulse in a readback signal. This is achieved due to the contour of the outside pole face edges of the pole tips. The contour of the outside pole tips of the present invention are significantly different from the contour at the gap, which is a straight line. The undershoot response from the outside pole face edge is concentrated along the portion of the contour which is furthest from the gap edge. The present invention provides a contour in which this concentration takes place at the edges of the gap, or slightly outside the edges of the gap. This region does not contain well defined transitions which are parallel to the gap surface, and is usually considered to be an erased region. In accordance with the present invention, a pole face edge has a significantly different contour if a cross-section of the pole tip has thickness variations which are greater than about the thickness of the magnetic flux gap region, especially if the thickest portion occurs at or outside of the gap edge, or forms a pinnacle which extends in a direction away from the gap. In one embodiment, an edge contour of the pole tips forms buck horns.

DETAILED DESCRIPTION OF THE PREFERRED EMBODIMENT

Figure 1:
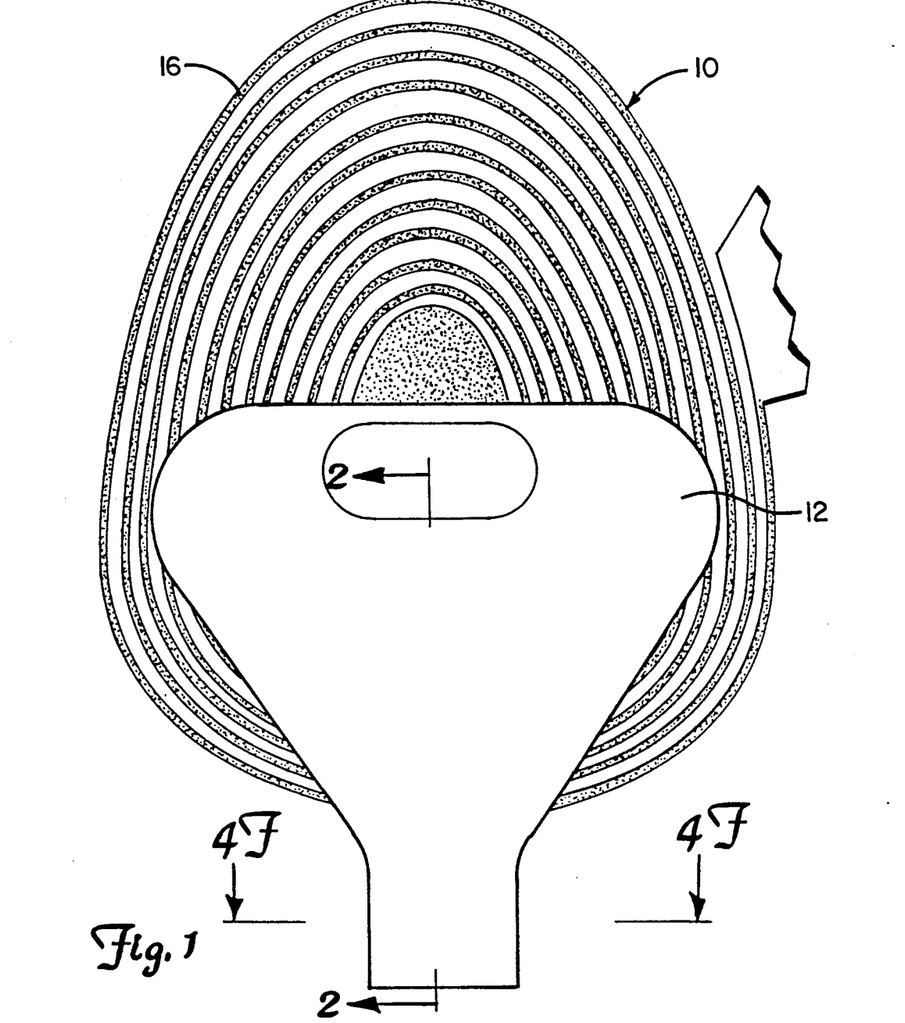
FIG. 1 shows a top view of a thin film magnetic read/write head.
Figure 2:
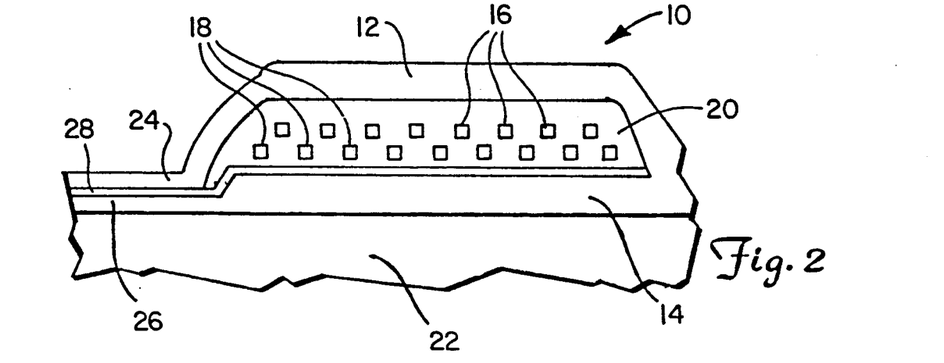
FIG. 2 is a side cross sectional view of the thin film magnetic of FIG. 1 taken along line 2—2.

A multi-turn inductive thin film magnetic head 10 is shown schematically in FIGS. 1 and 2. FIG. 1 is a top view of thin film head 10 and FIG. 2 is a side cross sectional view. Thin film head 10 includes top pole 12 and bottom pole 14. Top pole 12 and bottom pole 14 form a magnetic thin film core and comprise a nickel-iron (NiFe) alloy. Photolithography is used to define the geometry of both top pole 12 and bottom pole 14 of the magnetic core. Conductive coils 16 and 18 extend between top and bottom magnetic thin film poles 12 and 14 and are electrically insulated from magnetic core poles 12 and 14 by an insulating layer 20. Thin film head 10 is deposited upon a nonmagnetic substrate 22 which comprises a ceramic composite compound, such as $Al_2O_3$-TiC. Typically an $Al_2O_3$ base coat (not shown) separates the substrate of the bottom pole.

In fabricating thin film head 10, several separate pattern transfer processes are used to deposit head 10 upon substrate 22. These transfer processes include chemical etching, plating and sputtering. A typical head fabrication process may account for more than a dozen masking levels and more than thirty processing steps.

Figure 3A:
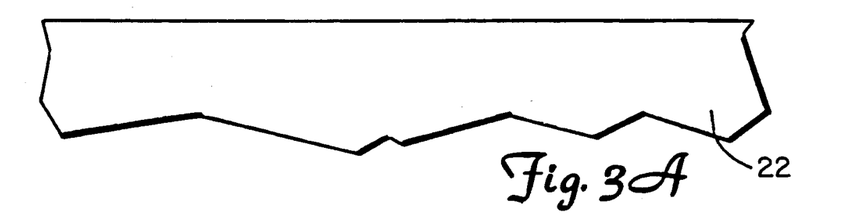
FIG. 3A is a cross-sectional view of a substrate.

FIGS. 3A–3F show the initial steps of pole tip alignment used in the present invention. FIG. 3A is a cross-sectional view of ceramic substrate 22. Ceramic substrate 22 forms the base upon which thin film head 10 (shown in FIG. 2) is fabricated.

Figure 3B:
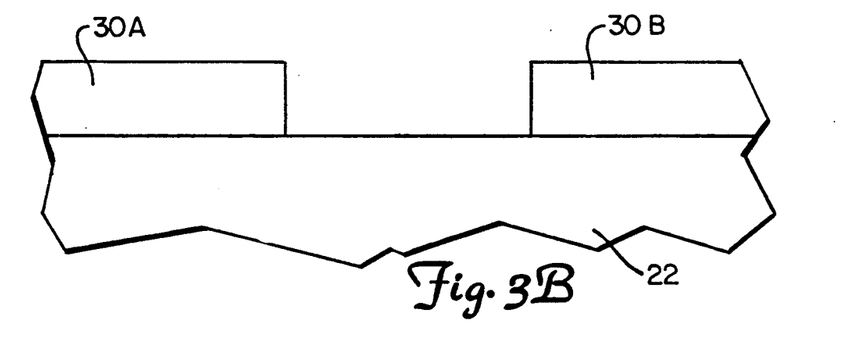
FIG. 3B is a cross-sectional view of the substrate of FIG. 3A including photoresist dams.

FIG. 3B is a cross-sectional view of substrate 22 including photoresist dams 30A and 30B. Photoresist dams 30A and 30B are formed by depositing a layer of photoresist across the surface of substrate 22. A portion of the photoresist layer is exposed to ultraviolet radiation. A special chemical etch is applied which removes the portion of the photoresist which was exposed to the radiation.

Figure 3C:
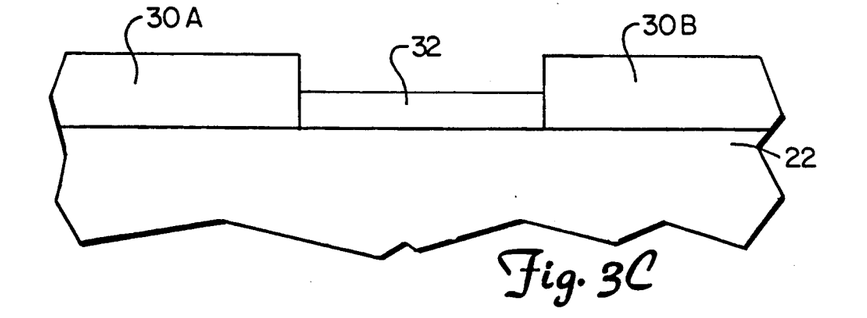
FIG. 3C is a cross-sectional view of a substrate including a lower pole piece.

FIG. 3C is a cross-sectional view of substrate 22 with photoresist dams 30A and 30B and a bottom pole 32. Bottom pole 32 comprises NiFe. (Bottom pole 32 may comprise any magnetic material.) Photoresist dams 30A and 30B define the edges of bottom pole 32.

Figure 3D:
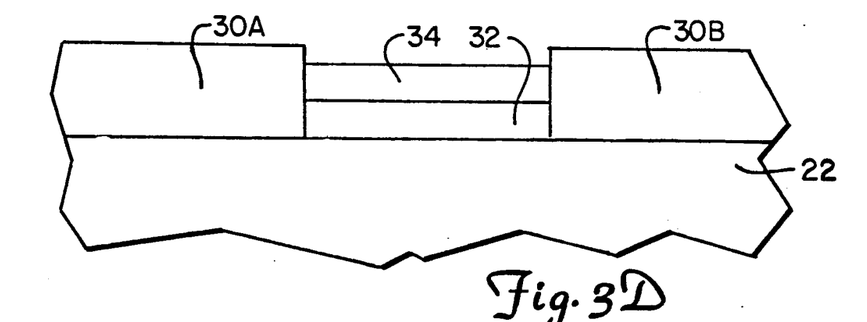
FIG. 3D is a cross-sectional view of a substrate which includes a sacrificial layer.

FIG. 3D is a cross-sectional view of substrate 22 which shows a sacrificial layer 34. Sacrificial layer 34 is deposited upon bottom pole 32 between photoresist dams 30A and 30B. Photoresist dams 30A and 30B define the edges of sacrificial layer 34. In a preferred embodiment, sacrificial layer 34 comprises copper. As shown in FIG. 3D, because sacrificial layer 34 is deposited using photoresist dams 30A and 30B used to deposit bottom pole 32, sacrificial layer 34 is in substantial alignment with bottom pole 32.

Figure 3E:
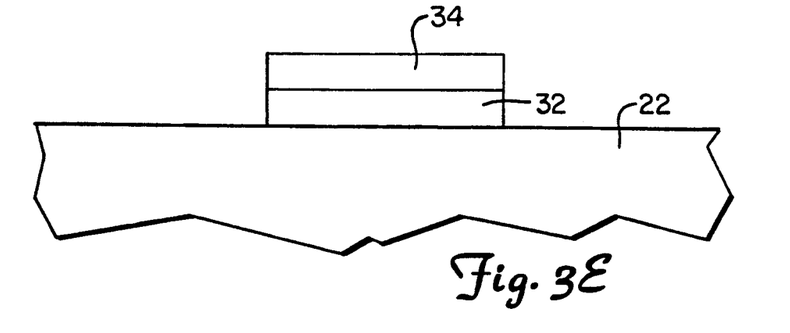
FIG. 3E is a cross-sectional view of a substrate following removal of photoresist dams.

FIG. 3E shows another step in the process of the present invention. In FIG. 3E, photoresist dams 30A and 30B have been stripped away. Photoresist dams 30A and 30B are stripped using a selective chemical etch which attacks only the photoresist dams 30A and 30B. The chemical etch leaves bottom pole 32 and sacrificial layer 34 substantially intact as shown in FIG. 3E.

Figure 3F:
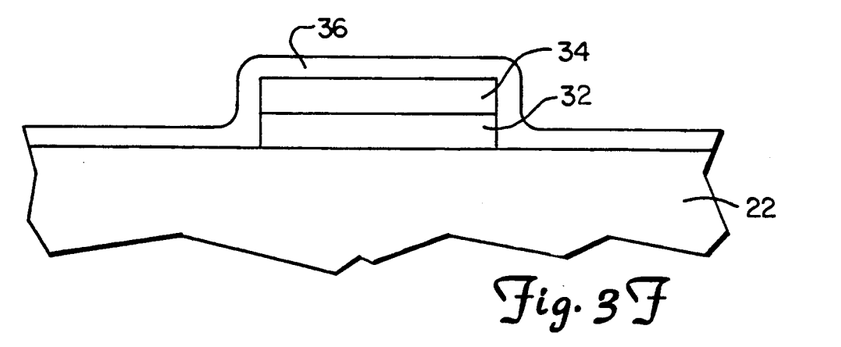
FIG. 3F is a cross-sectional view of a substrate following deposition of an $Al_2O_3$ layer.

FIG. 3F is a cross-sectional view of substrate 22 following deposition of an encapsulation layer 36. Encapsulation layer 36 preferably comprises $Al_2O_3$. Encapsulation layer 36 is deposited across the surface of substrate 22 and substantially encapsulates bottom pole 32 and sacrificial layer 34 as depicted in FIG. 3F. Encapsulation layer 36 may be deposited using a sputtering technique. The electrical bias and gas pressure applied during the sputtering process changes characteristics of the encapsulation layer 36.

In accordance with the present invention, after the steps shown in FIGS. 3A through 3F, sacrificial layer 34 may be removed using a suitable procedure to leave the edges of encapsulation layer 36 substantially intact. Encapsulation layer 36 forms two dams used in a subsequent deposition process. Between the two dams an upper pole is deposited which is in substantial alignment with the bottom pole.

Figure 4A:
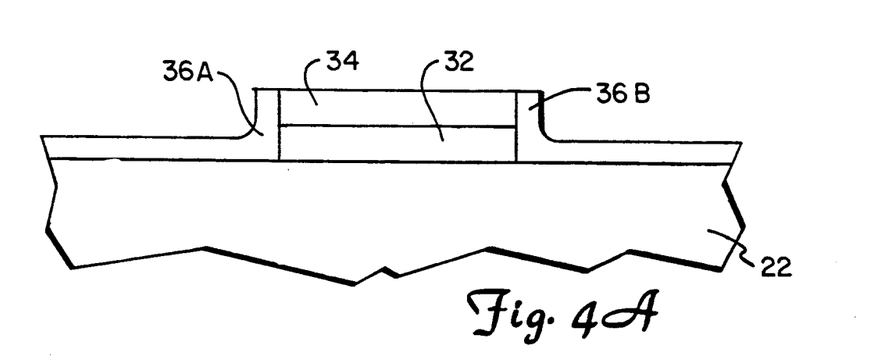
FIG. 4A is a cross-sectional view of a substrate following a lapping process.

FIGS. 4A through 4F show the steps of one alternative process for removing the sacrificial layer through lapping and selective chemical etching. In FIG. 4A, a cross-sectional view of substrate 22, encapsulation layer 36 has been lapped to expose a surface of sacrificial layer 34. The lapping process is a process in which a surface is applied to an abrasive which wears the surface down. In FIG. 4A, encapsulation layer 36 has been lapped to expose sacrificial layer 34 without substantially removing sacrificial layer 34. Following the lapping process, encapsulation layer 36 forms two separate pieces, dam 36A and dam 36B.

Figure 4B:
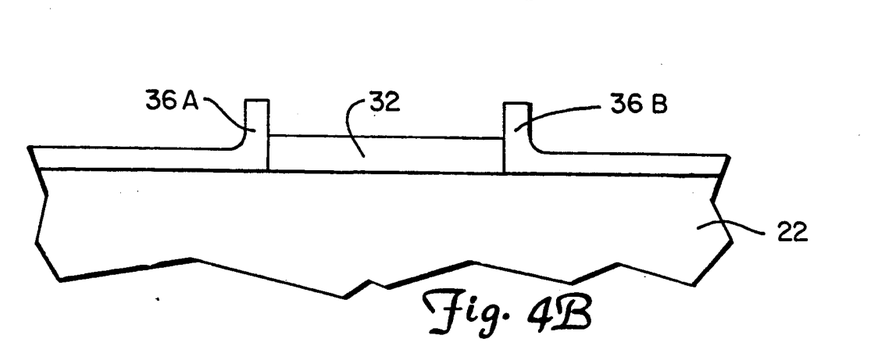
FIG. 4B is cross-sectional view of a substrate following removal of a sacrificial layer.

FIG. 4B shows a cross-sectional view of substrate 22 following a selective chemical etch of sacrificial layer 34. For example, if sacrificial layer 34 comprises copper, a selective chemical etch would be applied which attacks only copper and does not significantly alter lower pole 32 and dams 36A and 36B.

Figure 4C:
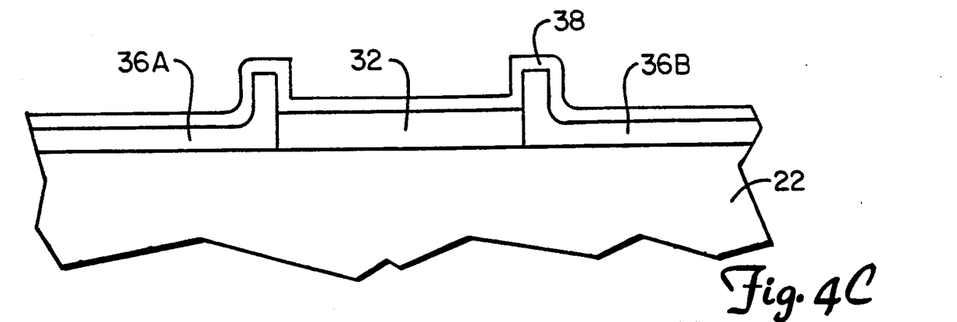
FIG. 4C is cross-sectional view of a substrate following deposition of an $Al_2O_3$ gap layer.

FIG. 4C is a cross-sectional view of substrate 22 including a gap layer 38. Typically, gap layer 38 comprises $Al_2O_3$. In a preferred embodiment, this gap layer 38 comprises the same material as dams 36A and 36B. Gap layer 38 is a non-magnetic material which forms a gap between the two magnetic pole tips in the thin film head.

Figure 4D:
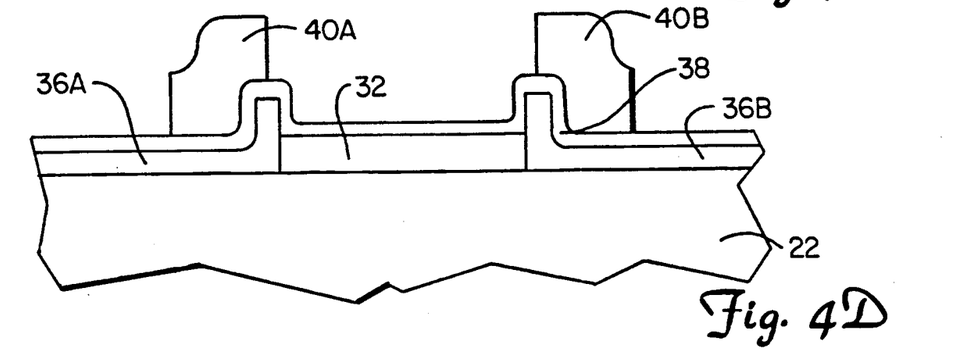
FIG. 4D is cross-section view following deposition of photoresist dams.

FIG. 4D is a cross-sectional view of substrate 22 including photoresist dams 40A and 40B. Photoresist dams 40A and 40B are used in forming a top pole 42 (shown in FIG. 4E). The alignment of photoresist dams 40A and 40B with lower pole 32 is not as critical as the alignment of dams 36A and 36B with lower pole 32. Photoresist dams 40A and 40B are deposited using a layer of photoresist which is selectively exposed to activating radiation and then chemically etched.

Figure 4E:
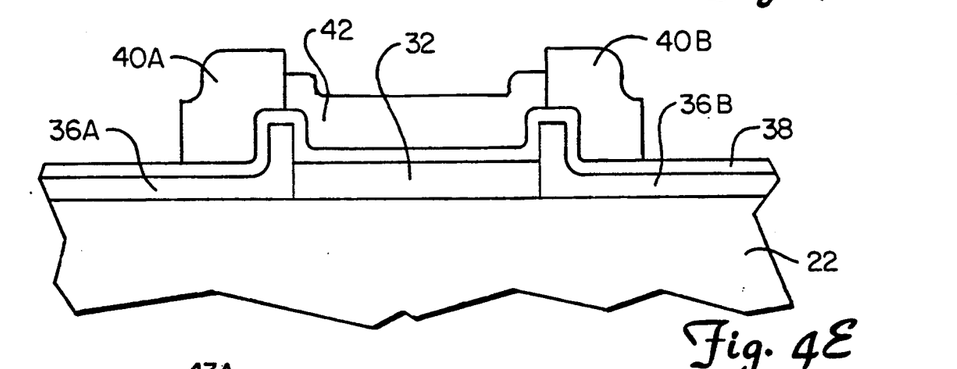
FIG. 4E is a cross-sectional view of a substrate following deposition of a top pole piece.

FIG. 4E shows a cross-sectional view of substrate 22 including upper pole 42. Upper pole 42 is deposited upon gap layer 38 and in substantial alignment with bottom pole 32. Dams 36A and 36B provide a close alignment between upper pole 42 and lower pole 32. The photoresist dams 40A and 40B also contain the outer edges of upper pole 42. Typically, upper pole 42 comprises NiFe. Upper pole 42 is used to complete a magnetic flux circuit between upper pole 42 and lower pole 32 across gap layer 38.

Figure 4F:
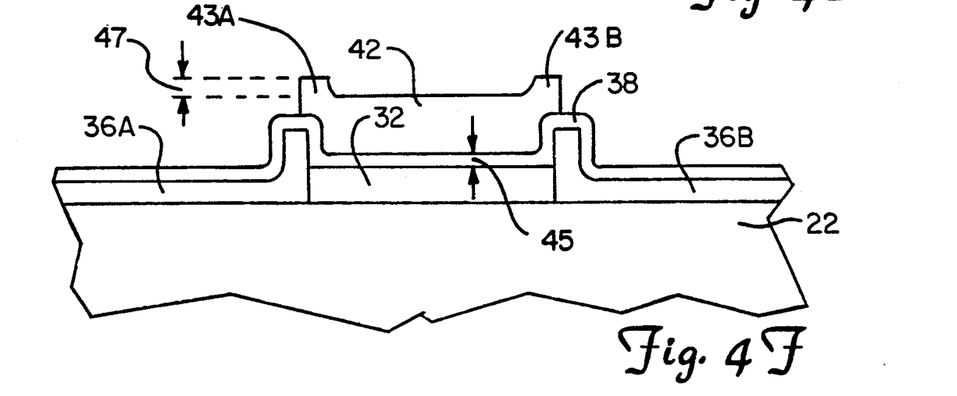
FIG. 4F is a cross-sectional view of FIG. 1 taken along line 4F—4F.

FIG. 4F is a cross-sectional view of substrate 22 following removal of photoresist dams 40A and 40B. FIG. 4F shows a substantially complete cross-sectional view of thin film head 10 shown in FIG. 1 taken along line 4F—4F. Typically, the structure of FIG. 4F is encapsulated in a non-magnetic material such as $Al_2O_3$. Dams 36A and 36B remain deposited upon substrate 22 after completion of the fabrication process. Upper pole 42 rises up, away from the gap area, in regions 43A and 43B which reduce undershoot in isolated readback pulses in accordance with the present invention. Gap layer 38 has a thickness 45. Regions 43A and 43B are also referred to herein as "buck horns." Buck horns 43A and 43B introduce a thickness variation 47 in upper pole 42 which is greater than about half of gap thickness 45, in accordance with the present invention.

Figure 5A:
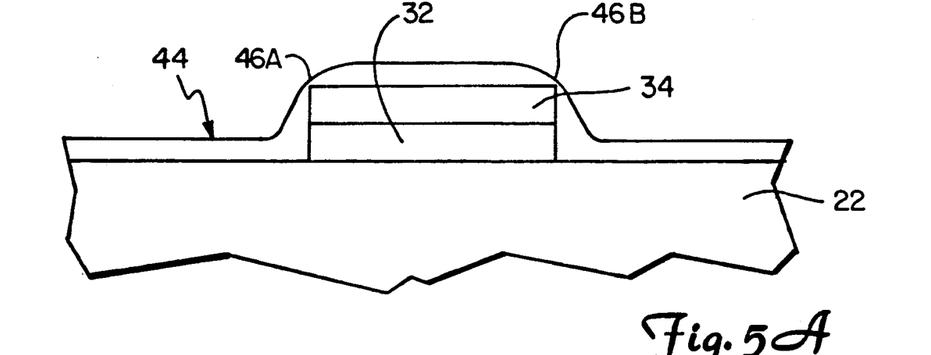
FIG. 5A is a cross-sectional view of a substrate which shows an encapsulation layer.

FIG. 5A shows another alternative embodiment of forming dams with a sacrificial layer in accordance with the present invention. FIG. 5A is a cross-sectional view of substrate 22. In FIG. 5A an encapsulation layer 44 is deposited upon lower pole 32 and sacrificial layer 34. Typically, encapsulation layer 44 comprises $Al_2O_3$, a non-magnetic material. Encapsulation layer 44 is sputtered upon substrate 22 and sacrificial layer 34. During the sputtering process, an electrical bias potential is applied which is sufficiently negative to form a incline in encapsulation layer 44 at corners 46A and 46B of sacrificial layer 34. For example, electrical bias between the substrate and the source should be between about −100 volts and about −160 volts, which is about 10% to 16% of the target voltage. Gas pressure should be about 10 milliTorr to 20 milliTorr. These parameters depend upon characteristics of the deposition process. In FIG. 5A, encapsulation layer 44 is relatively thin near corners 46A and 46B of sacrificial layer 34.

Figure 5B:
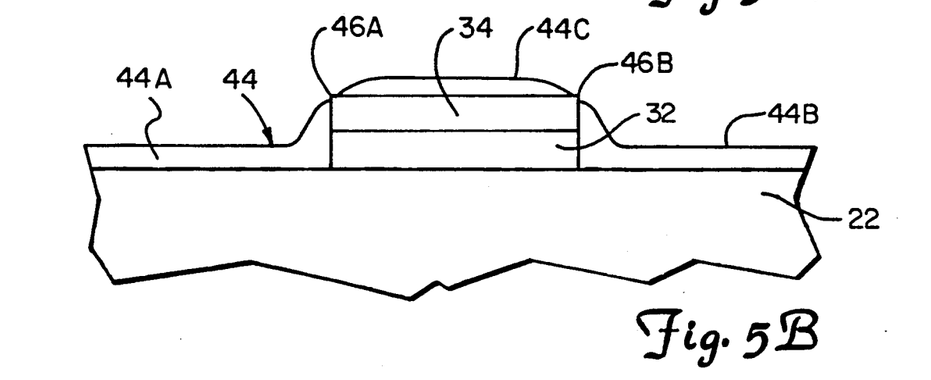
FIG. 5B is a cross-sectional view of a substrate including an encapsulation layer and a partially exposed sacrificial layer.

FIG. 5B shows a cross-sectional view of substrate 22 in which corners 46A and 46B of sacrificial layer 34 are exposed through encapsulation layer 44. Corners 46A and 46B of encapsulation layer 44 are exposed by slightly ion milling encapsulation layer 44 shown in FIG. 5A or by applying a mild chemical etch to encapsulation layer 44. Alternatively, the electrical bias applied during sputtering and the amount of material sputtered down may be adjusted so that corners 46A and 46B are not completely covered by encapsulation layer 44. In either case, once corners 46A and 46B of encapsulation 44 are exposed, a selective chemical etch can be applied to sacrificial layer 34. For example, if sacrificial layer 34 comprises copper, a copper chemical etch can be applied. This lifts off the portion 44C of encapsulation layer 44 which overlies sacrificial layer 34. The result and cross-sectional view is similar to the cross-sectional view shown in FIG. 4B. Subsequent steps can be followed to fabricate an upper pole 42 as shown FIGS. 4C through 4F.

Figure 6A:
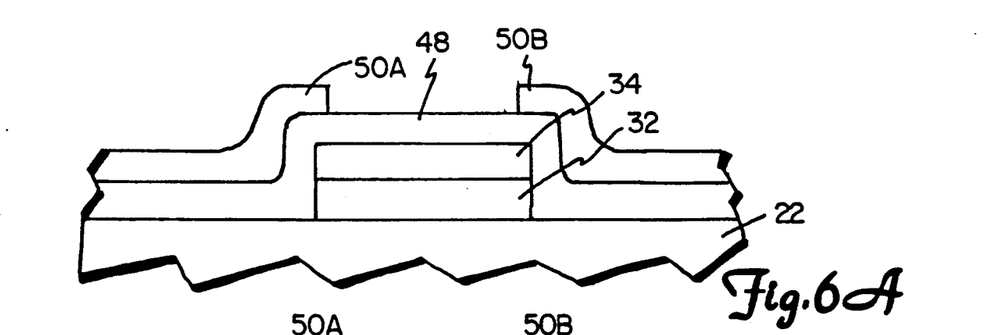
FIG. 6A is a cross-sectional view of a substrate which shows an encapsulation layer and photoresist dams.
Figure 6B:
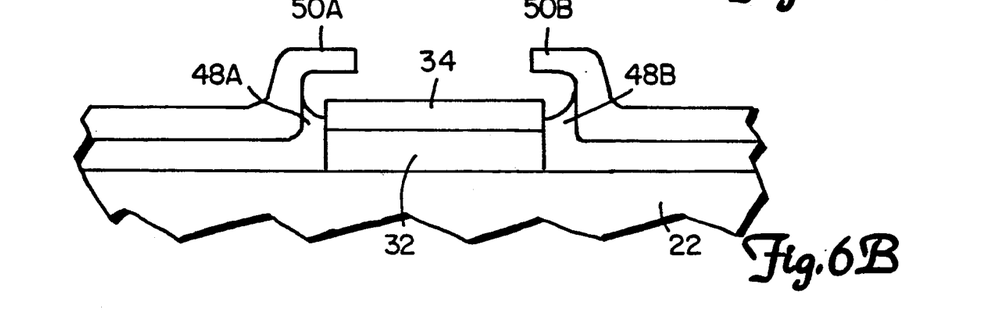
FIG. 6B is a cross-sectional view of a substrate including photoresist dams and a partially exposed sacrificial layer.

FIGS. 6A and 6B show another alternative embodiment of forming dams with a sacrificial layer in accordance with the present invention. FIG. 6A shows a cross-sectional view of a substrate 22 in which lower pole 32 and sacrificial layer 34 is covered by an encapsulation layer 48. In FIG. 6A, photoresist dams 50A and 50B partially cover encapsulation layer 48 and leave a portion of encapsulation layer 48 exposed. A selective chemical etch is applied to encapsulation layer 48 which selectively etches only the material of encapsulation layer 48. This forms encapsulation layer dams 48A and 48B shown in FIG. 6. Photoresist dams 50A and 50B are chemically stripped. Sacrificial layer 34 is selectively etched. This leaves an encapsulation layer dam structure similar to that shown in FIG. 4B. The cavity formed between encapsulation layer dams 48A and 48B may be filled with a top pole piece as described above.

In another alternative process for removing the portion of the encapsulation layer which overlies the sacrificial layer, the encapsulation layer is sputtered using an electrical bias of zero volts. Gas pressure should be about 20 to about 30 milliTorr. These parameters depend upon the sputtering mechanism. This causes the encapsulation layer to weakly adhere to the sacrificial layer. The portion of the encapsulation layer which overlies the sacrificial layer may be removed by subjecting the structure to physical or thermal shocks. The physical or thermal shocks cause the encapsulation layer to break free from the sacrificial layer and leave behind dams on either side of the lower pole. The sacrificial layer can be removed using a selective chemical etch as described above.

Figure 7:
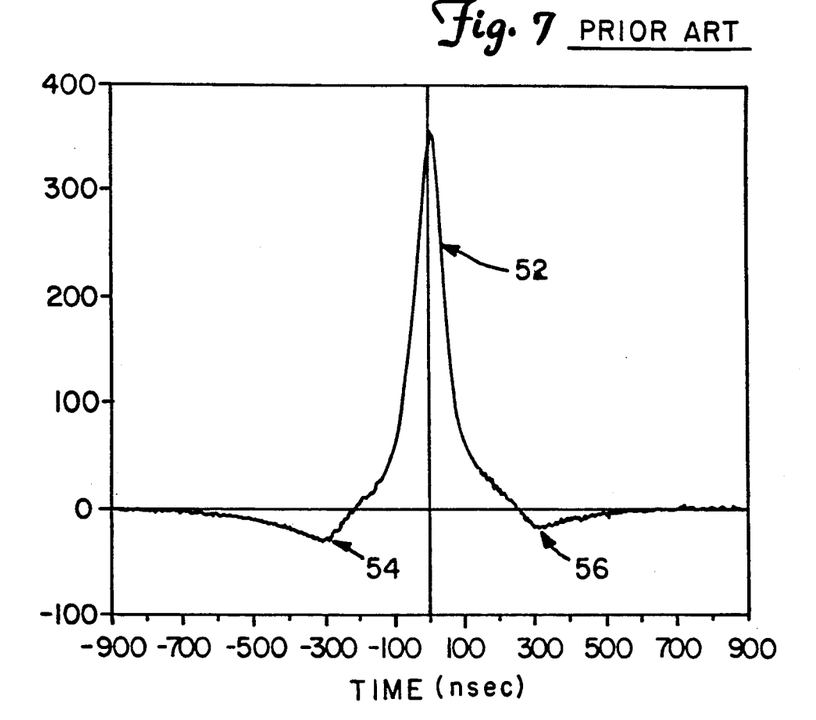
FIG. 7 shows an isolated readback pulse for a prior art thin film magnetic head.

It has been discovered that thin film head pole tips made in accordance with the present invention provide isolated readback pulses which have reduced undershoots. FIG. 7 is a graph of an isolated readback pulse 52 of a prior art magnetic head which includes undershoots 54 and 56. These undershoots are due to the change in the magnetic flux linking the head coils from the magnetic storage medium, as a magnetic transition in the media passes under each outside pole face edge.

Figure 8:
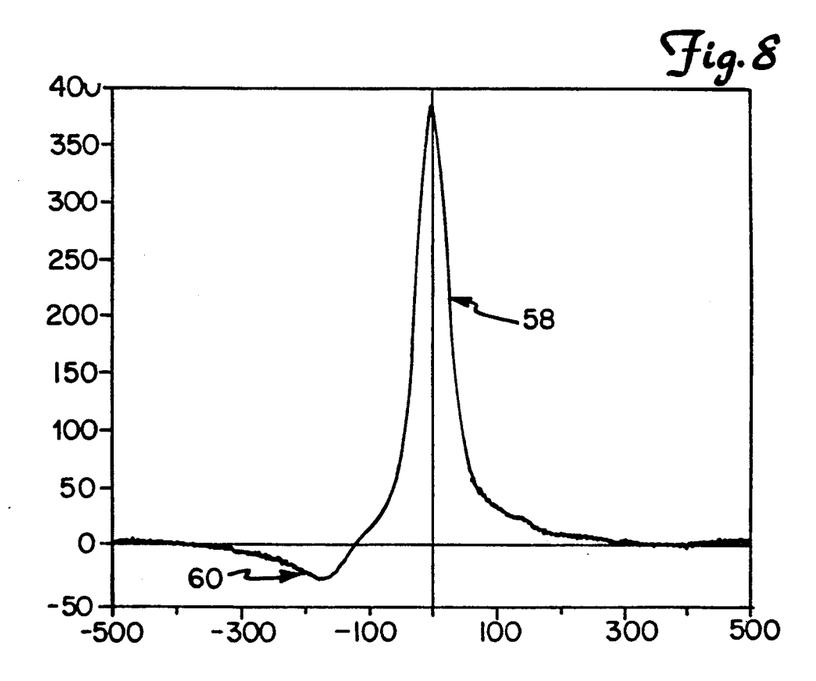
FIG. 8 shows an isolated readback pulse for a thin film magnetic head having a top pole tip made in accordance with the present invention.

FIG. 8 is a graph of an isolated readback pulse from a thin film magnetic head made in accordance with the present invention. The thin film magnetic head which generated isolated readback pulse 58 has a top pole with regions 43A and 43B as shown in FIG. 4F. In accordance with the present invention, this shape significantly reduces undershoot, in this case the trailing undershoot, as shown in FIG. 8. Since only the shape of the top pole outside edge is changed and not the bottom pole outside edge, a leading undershoot 60 remains in isolated readback pulse 58. However, if the shape of a bottom pole outside edge were also changed in accordance with the present invention, the amplitude of undershoot 60 would also be significantly reduced.

It is believed that a "significantly different" contour in accordance with the present invention is achieved in a pole tip which has a thickness variation of greater than about one half the thickness of the gap region.

Figure 9A:
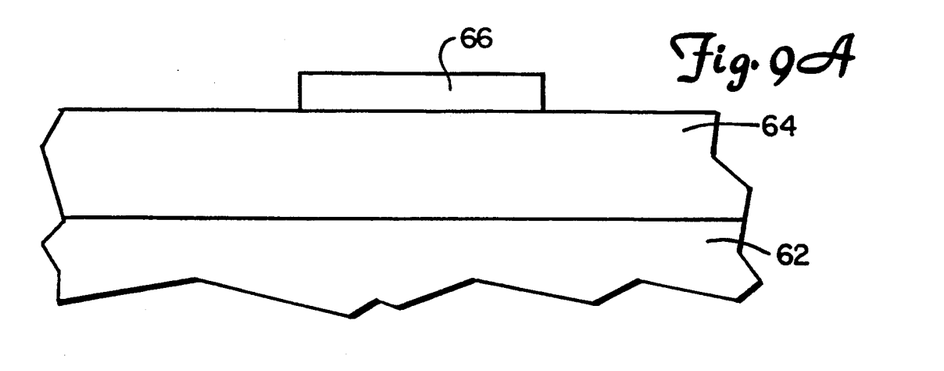
FIGS. 9A through 9E show steps in making a thin magnetic head having upper and lower pole tips made in accordance with the present invention which reduce undershoot in an isolated readback pulse.
Figure 9B:
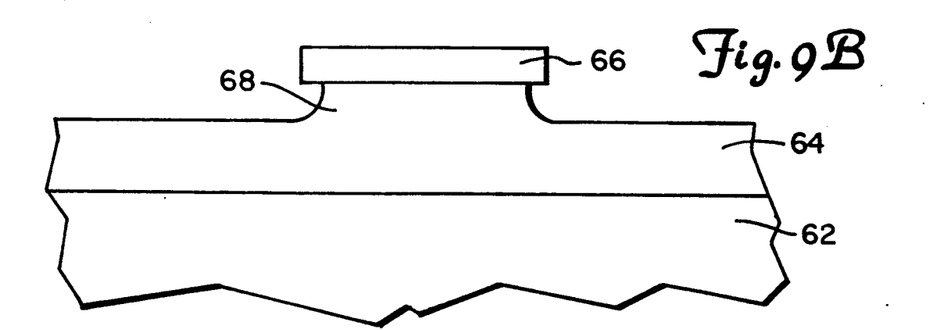

FIGS. 9A through 9E show steps used in fabricating thin film magnetic head pole tips in which both upper and lower pole tips have regions at or beyond the sides of the gap, which extend away from the gap, to reduce leading and trailing undershoots in the resulting isolated readback pulse, in accordance with the present invention. In FIG. 9A, a non-magnetic substrate 62 carries a coating of alumina (Al$_2$O$_3$) base coat layer 64. A photoresist mask 66 is deposited upon alumina base coat layer 64. Mask 66 should have dimensions which are wide enough to leave a large enough base for a bottom pole to be deposited even if undercut occurs during a subsequent etching step.

Figure 9C:
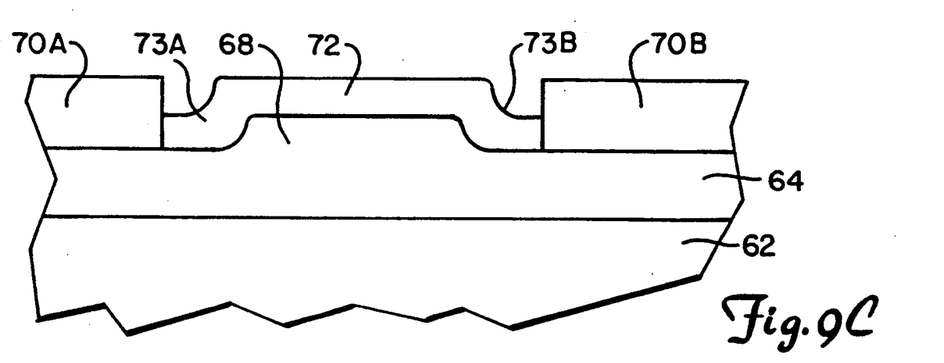

After photoresist mask 66 is deposited, a chemical etchant is applied which attacks alumina base coat 64. For example, alumina base coat 64 can be etched down approximately three micrometer (3 μm) using a bath of 10% HF solution in deionized water. Alternatively, sputter etching with ion milling, or any physical etching process can be used. This forms a plateau 68 in alumina base coat 64. After forming plateau 68, photoresist mask 66 is removed. Next, masks 70A and 70B shown in FIG. 9C are deposited just beyond the edges of plateau 68. A first bottom pole layer 72 is plated between masks 70A and 70B. First bottom pole layer 72 includes buck horns 73A and 73B in accordance with the present invention. Masks 70A and 70B are then removed.

Figure 9D:
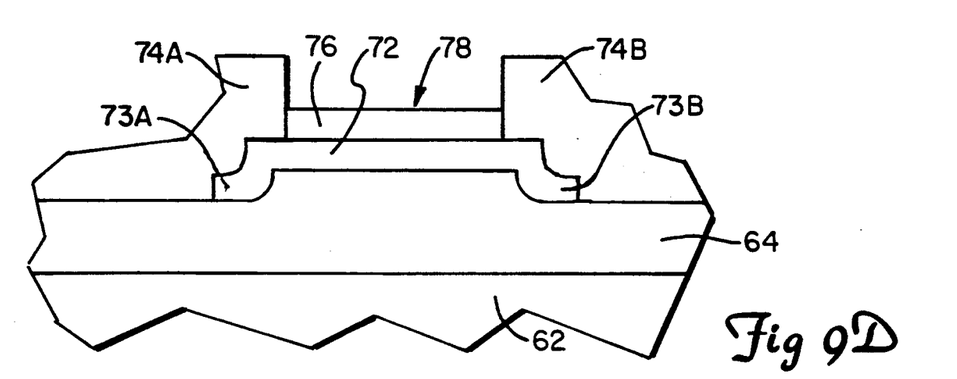
Figure 9E:
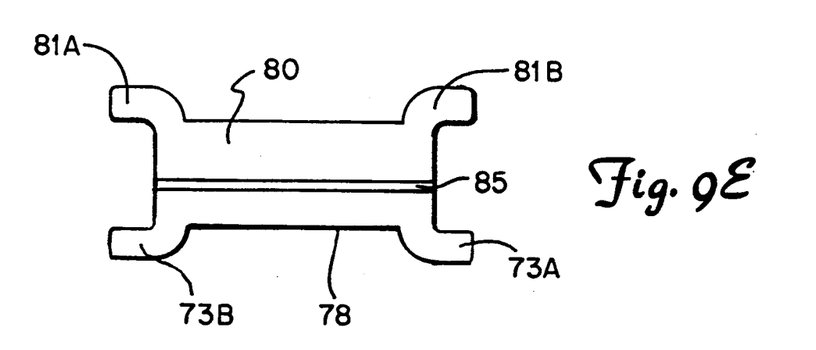

After photoresist masks 70A and 70B are removed, photoresist masks 74A and 74B are deposited on the first bottom pole layer 72 as shown in FIG. 9D. A second bottom pole layer 76 is deposited between photoresist masks 74A and 74B. First bottom pole layer 72 and second bottom pole layer 76 combine to form bottom pole 78. Bottom pole 78 has a shape, relative to the gap, which is similar to the shape of upper pole 42 shown in FIG. 4F. Next, an upper pole 80 is deposited as shown in FIG. 9E. Upper pole 80 can be deposited in a manner similar to that described above, such as that shown in FIGS. 4A through 4F. A gap region 85 separates poles 78 and 80. Upper pole 80 includes buck horns 81A and 81B in accordance with the present invention. The resulting pole structure has an upper pole 80 and a lower pole 78 both of which have regions at the sides of the gap which extend away from the gap. This shape eliminates both leading and trailing undershoots. Additionally, upper pole tip 80 and lower pole tip 78 are in substantial alignment with each other. Lower pole tip 78 can be formed using any suitable physical process.

Figure 10:
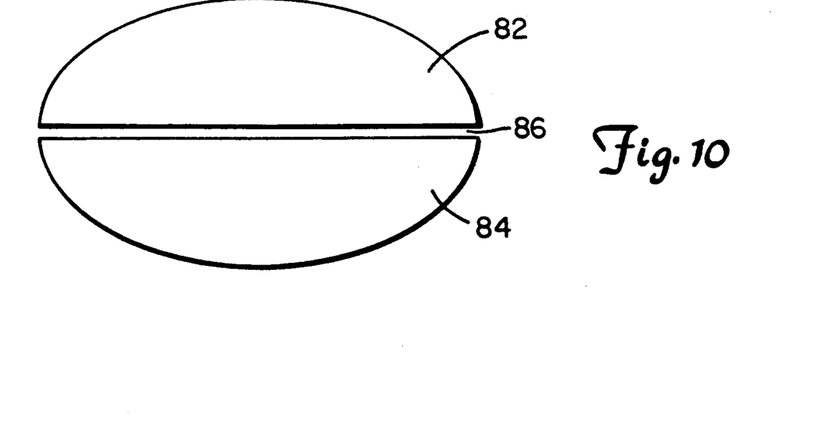
FIG. 10 shows contoured pole tips having a contour in accordance with the present invention.
Figure 11:
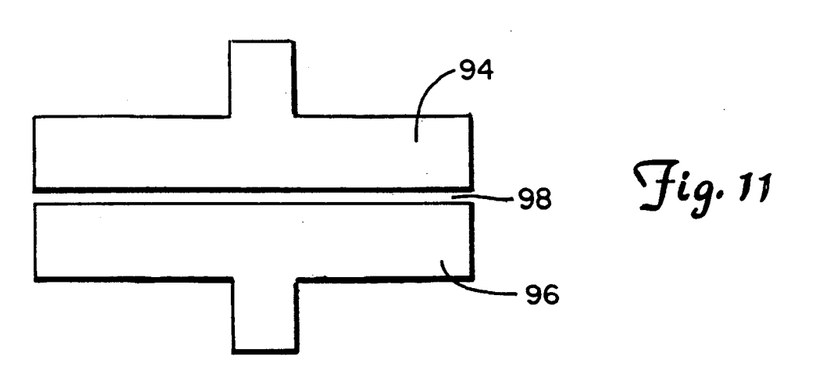
FIG. 11 shows contoured pole tips having a contour in accordance with the present invention.

FIGS. 10 and 11 show a number of different pole tip contours in accordance with the present invention. In FIG. 10, an upper pole tip 82 and a lower pole tip 84 have rounded contours along the edges which are far from a gap 86. FIG. 11 shows an upper pole tip 94 and a lower pole tip 96 which provide a narrower region along the edge which protrudes farther from a gap 98.

It is believed that any contour along the edge of the pole tip opposite the gap region which is significantly different from the contour along the gap region will attenuate and broaden an undershoot. In addition, sharp corners enhance the sensitivity to a passing transition in the media and these must be eliminated. FIGS. 9E, 10, and 11 all show various implementations of the present invention. In any case, the significant feature of pole tips made in accordance with the present invention is that the contour along an outer edge of the pole tip is significantly different than the contour along the gap edge of the pole tip. Specifically, pole tips in accordance with the present invention have thickness variations which are greater than about one half the thickness of a magnetic flux gap region.

Figure 12:
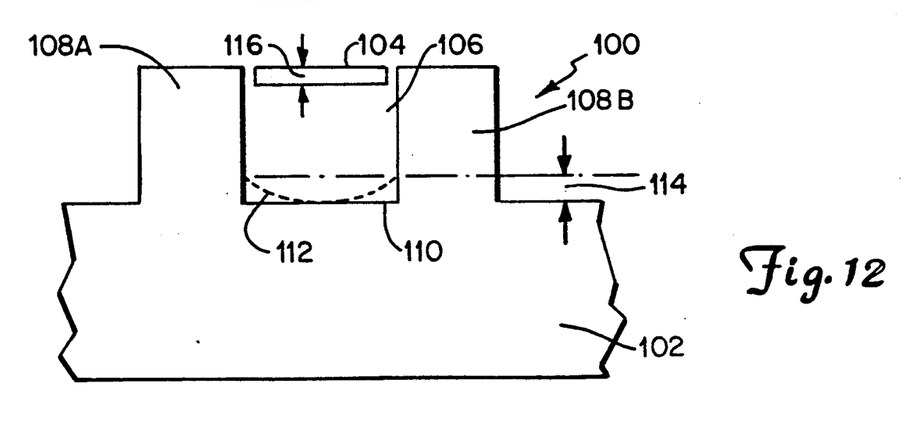
FIG. 12 is a cross sectional view of a pole tip face of a probe head used for vertical magnetic record made in accordance with the present invention.

It is also believed that pole tip shapes in accordance with the present invention can be used in magnetic probe heads which are used for vertical recording on perpendicular magnetic media. (In vertical recording, the direction of magnetism in the magnetic recording medium is altered in a vertical direction, rather than a horizontal one.) FIG. 12 shows a cross-section of a pole tip face 100 from a probe head which is used for vertical magnetic recording. Pole tip face 100 includes a thick magnetic closure pole 102, with integral track edge fringing, shields 108A and 108B, top pole 104, and a thick gap 106. In operation, the flux path is usually completed by a soft magnetic layer which is deposited beneath the high coercivity recording layer in the recording media. Shields 108A and 108B are used to improve off-track characteristics of magnetic probe 100. Gap edge 110 creates a leading undershoot in isolated readback pulses. However, if a gap edge shown by dashed line 112 is used in magnetic probe 100, undershoot is believed to be reduced in accordance with the present invention. Contouring gap edge 110 differently than the gap edge provided by upper pole tip 104 is the equivalent to contouring the outside pole face edges differently than the gap for a longitudinal recording head as described above. Although a curved shape is shown for gap edge 112, other contoured shapes may be used for the gap edges in accordance with the present invention.

For pole tip face 100, gap edge contour 112 should be significantly different than the contour of top pole 104. In the case of a magnetic probe such as that shown in FIG. 12, "significantly different" means that contour thickness 114 of gap edge contour 112 should be more than about one quarter of thickness 116 of top pole 104.

The present invention provides a method of fabricating closely aligned pole tips in a thin film magnetic head. In the present invention, a top pole is aligned with a bottom pole using dams made with a sacrificial layer. The dams are formed by depositing an encapsulation layer over the sacrificial layer. When the sacrificial layer is removed, the encapsulation layer which overlies the sacrificial layer is removed. This provides two dams formed from the encapsulation layer on either side of the bottom pole. These dams are used to form the top pole in substantial alignment with the bottom pole.

The present invention reduces undershoot in isolated readback pulses by providing contoured edges in the pole tip face. The contour acts to attenuate and broaden the undershoot by either spreading the effective sensitivity of the pole face edge over a longer distance in a direction perpendicular to the gap, concentrating the sensitivity to undershoot at the erased zones at the sides of the gap, dispersing the sensitivity to undershoot in directions which differ greatly from the axis of magnetization in the media, or by a combination thereof. This technique may be used along outer pole tip edges in longitudinal recording heads, and along inner pole tip edges in vertical recording heads.

Although the present invention has been described with reference to preferred embodiments, workers skilled in the art will recognize that changes may be made in form and detail without departing from the spirit and scope of the invention. For example, the encapsulation layer and sacrificial layer may be formed using any suitable material such as a ceramic, a glass or Si, and the steps of forming dams with the encapsulation by removing the sacrificial layer may be through any suitable means. Furthermore, the sacrificial layer may comprise any suitable selectively etchable layer and the magnetic layers may comprise magnetic material other than NiFe. Additionally, different pole tip edge contours can be used to reduce undershoot in isolated readback pulses and pole tip shapes in accordance with the present invention can be made using any suitable technique.

What is claimed is:

1. A method of manufacturing a thin film magnetic head comprising:
   depositing a bottom pole layer over a substrate;
   depositing a sacrificial layer over the bottom pole layer;
   depositing an encapsulation layer over the sacrificial layer and the substrate;
   removing a portion of the sacrificial layer to form first and second dams from the encapsulation layer;
   depositing a magnetic gap layer over the bottom pole layer; and
   depositing an upper pole layer between the first and second dams and over the bottom pole layer, wherein the upper pole layer has an upper pole contour along an edge which is far from the magnetic gap layer and the upper pole contour is significantly different from a contour of the magnetic gap layer.

2. The method of claim 1 wherein the upper pole contour includes buck horns.

3. The method of claim 1 wherein the contour of the magnetic gap layer is a generally straight line.

4. The method of claim 1 wherein depositing a bottom pole layer comprises depositing a bottom pole layer which has a bottom pole contour along an edge which is far from the magnetic gap layer, wherein the bottom pole contour is a significantly different from a contour of the magnetic gap layer.

5. The method of claim 4 wherein bottom pole contour includes buck horns.

6. The method of claim 4 wherein the contour of the magnetic gap layer is a generally straight line.

7. The method of claim 1 wherein the gap layer has a gap layer thickness and the upper pole layer has a variable upper pole layer thickness, the upper pole layer thickness varies by more than about one half of the gap layer thickness.

8. A method of manufacturing a thin film magnetic head comprising:
   depositing a first photoresist dam and a second photoresist dam upon a substrate;
   depositing a bottom pole layer over the substrate and between the first and second photoresist dams;
   depositing a sacrificial layer over the bottom pole and between the first and second photoresist dams, wherein the sacrificial layer is in substantial alignment with the bottom pole layer;
   removing the first and second photoresist dams;
   depositing an encapsulation layer over the sacrificial layer and the substrate;
   removing the sacrificial layer to form a first encapsulation layer dam and a second encapsulation layer dam from the encapsulation layer wherein the first and second encapsulation layer dams are in substantial alignment with the bottom pole layer wherein removing the sacrificial layer comprises:
   depositing a first photoresist dam and a second photoresist dam upon the encapsulation layer;
   applying a selective chemical etch to the encapsulation layer wherein a portion of the encapsulation layer is removed to form the first and second dams; and
   removing the first photoresist dam and the second photoresist dam;
   depositing a third photoresist dam over the first encapsulation layer dam;
   depositing a fourth photoresist dam over the second encapsulation layer dam;
   depositing an upper pole layer between the first and second encapsulation layer dams and between the third and fourth photoresist dams and over the bottom pole layer, wherein depositing an upper pole layer comprises depositing an upper pole layer which has an upper pole contour along an edge which is far from the magnetic gap layer and the upper pole contour is significantly different from a contour of the magnetic gap layer; and
   removing the third and fourth photoresist dams.

9. The method of claim 8 wherein the upper pole contour includes buck horns.

10. The method of claim 8 wherein the contour of the magnetic gap layer is a generally straight line.

11. The method of claim 8 wherein depositing a bottom pole layer comprises depositing a bottom pole layer which has a bottom pole contour along an edge which is far from the magnetic gap layer wherein the bottom pole contour is significantly different from a contour of the magnetic gap layer.

12. The method of claim 11 wherein the bottom pole contour includes buck horns.

13. The method of claim 11 wherein the contour of the magnetic gap layer is a generally straight line.

14. The method of claim 8 wherein the gap layer has a gap layer thickness and the upper pole layer has a variable upper pole layer thickness, the variable upper pole layer thickness varies by more than about one half of the gap layer thickness.

* * * * *